Figure 1:
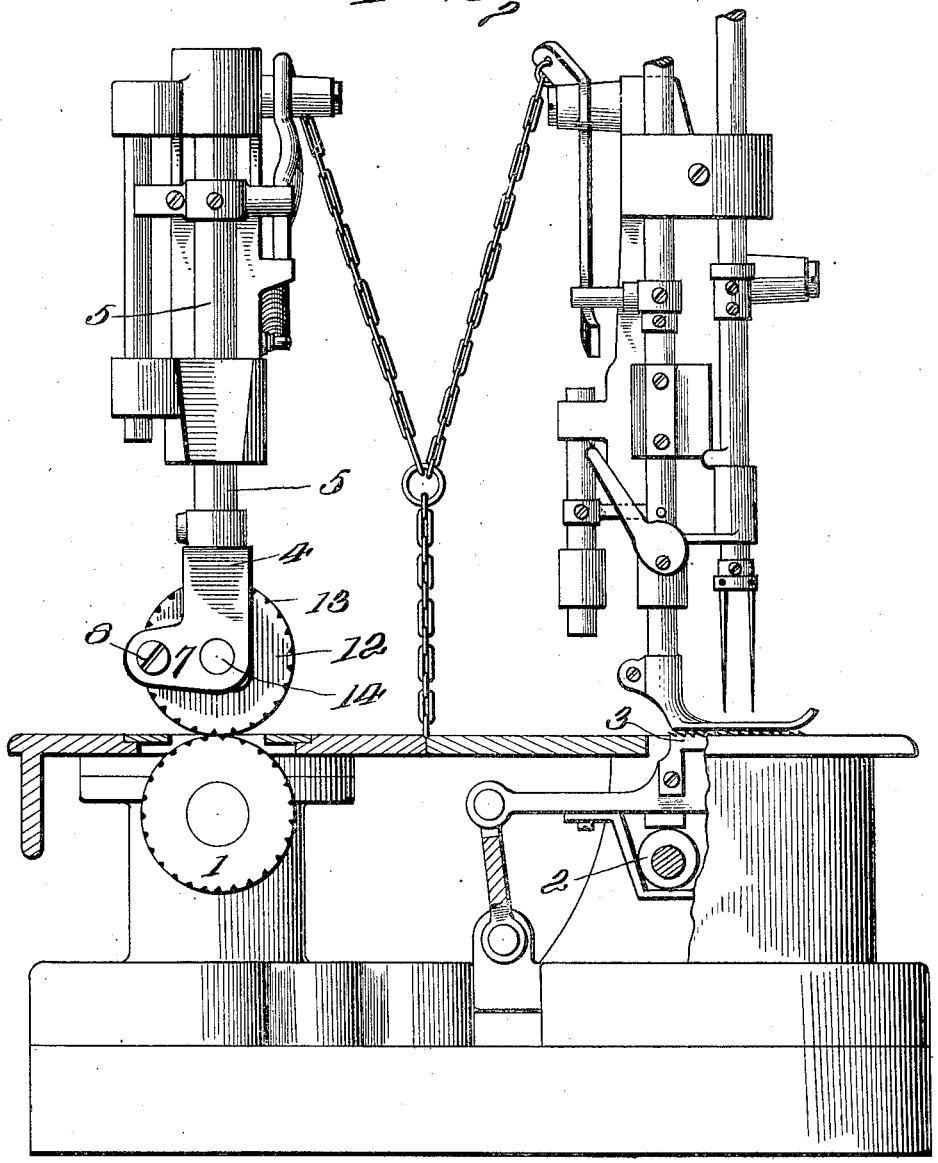

Oct. 30, 1923.

J. R. MOFFATT 1,472,277

PRESSER ROLLER FOR PULLER MACHINES

Filed Nov. 26, 1919     5 Sheets-Sheet 1

Inventor

James R. Moffatt

By Sturtevant & Mason Attorneys

Oct. 30, 1923.
J. R. MOFFATT
1,472,277
PRESSER ROLLER FOR PULLER MACHINES
Filed Nov. 26, 1919     5 Sheets-Sheet 2
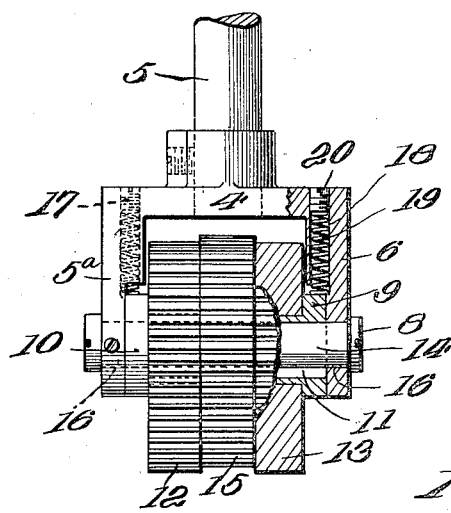
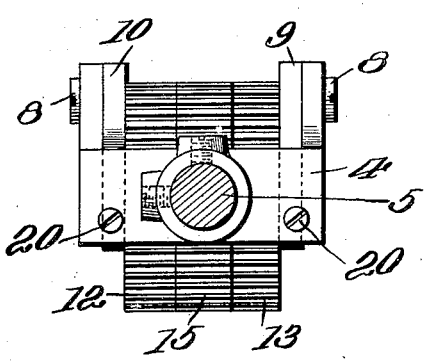
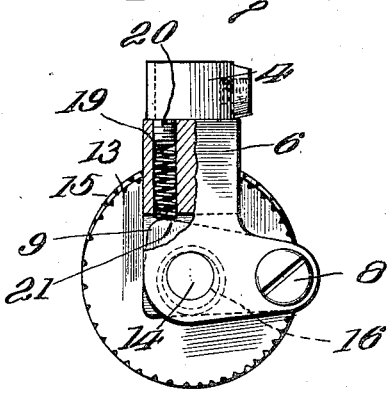
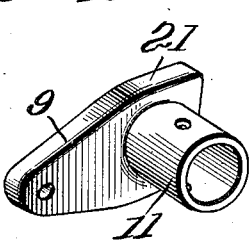
Inventor
James R. Moffatt
By
Sturtevant & Mason Attorneys Oct. 30, 1923.
1,472,277
J. R. MOFFATT
PRESSER ROLLER FOR PULLER MACHINES
Filed Nov. 26, 1919 5 Sheets-Sheet 3
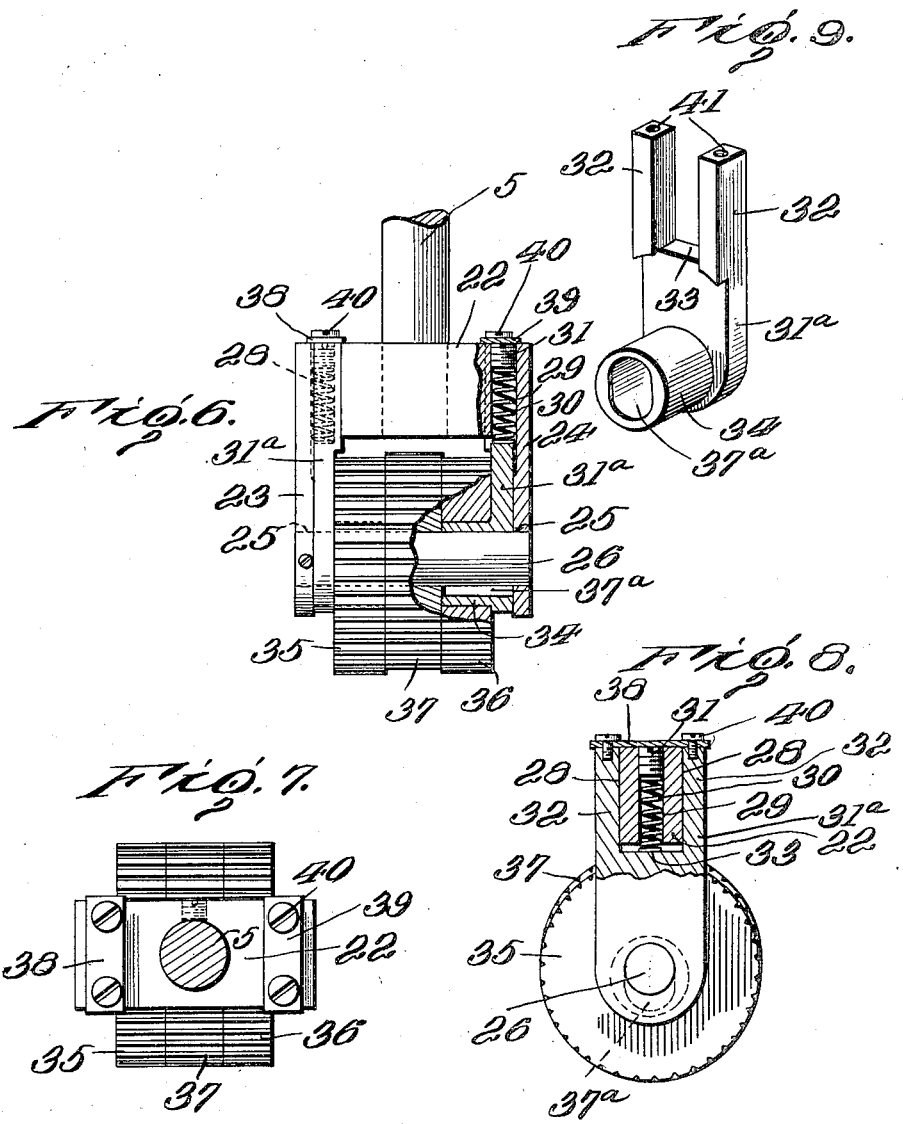

Oct. 30, 1923.
J. R. MOFFATT
PRESSER ROLLER FOR PULLER MACHINES
Filed Nov. 26, 1919
1,472,277
5 Sheets-Sheet 4
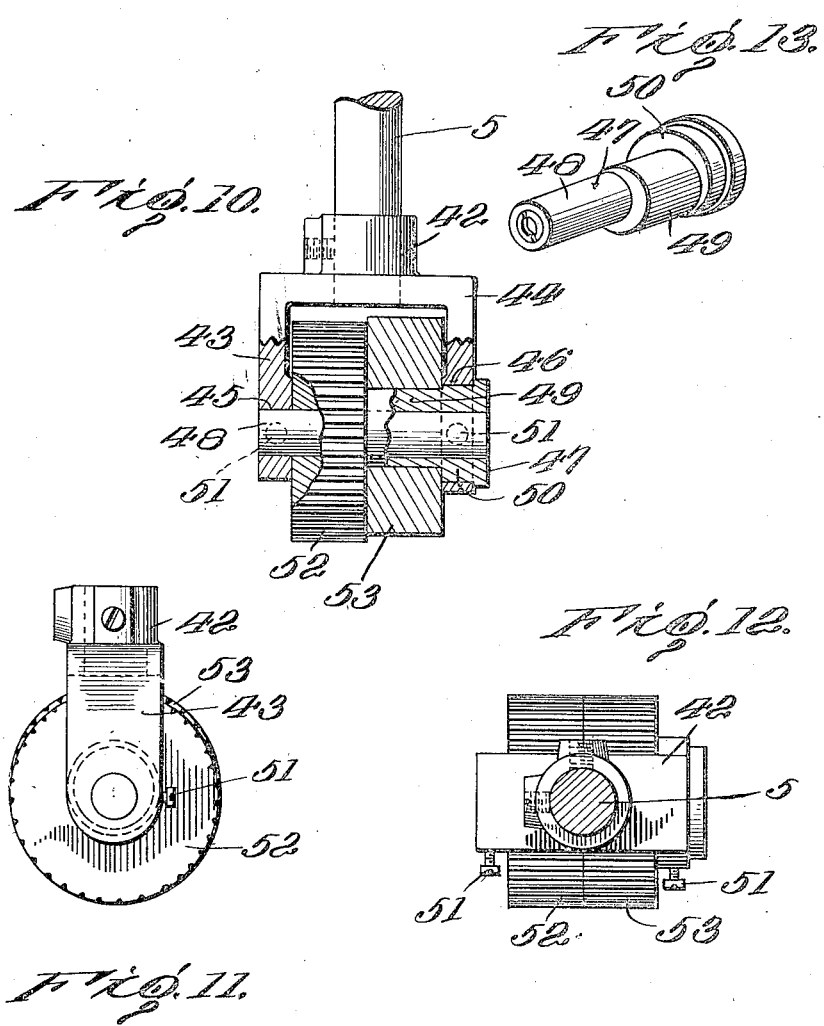

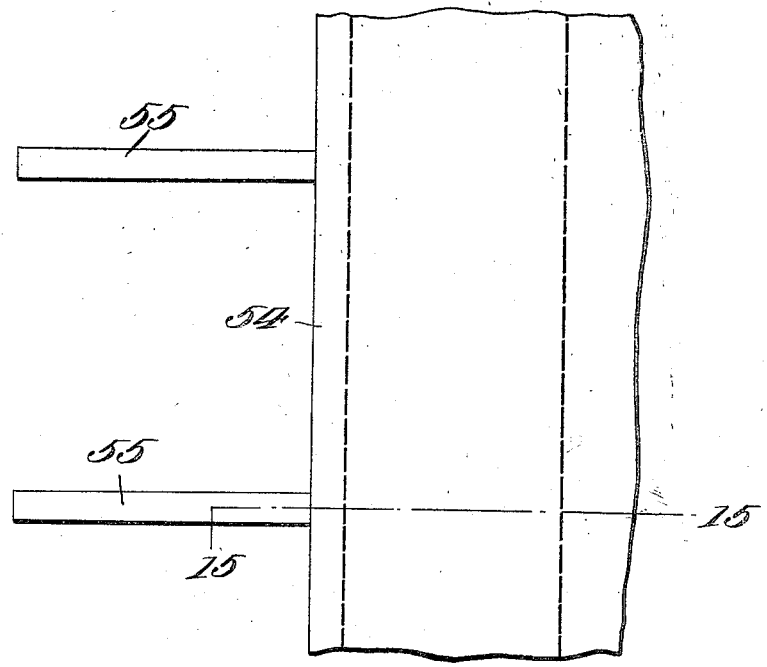
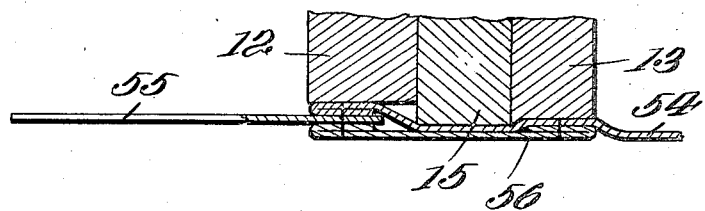

Patented Oct. 30, 1923.

1,472,277

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

PRESSER ROLLER FOR PULLER MACHINES.

Application filed November 26, 1919. Serial No. 340,817.

*To all whom it may concern:*

Be it known that I, JAMES R. MOFFATT, a citizen of the United States, residing at Chicago, in the county of Cook, State of Illinois, have invented certain new and useful Improvements in Presser Rollers for Puller Machines, of which the following is a description, reference being had to the accompanying drawing and to the figures of reference marked thereon.

The invention relates to new and useful improvements in puller feeds for sewing machines and more particularly to a puller feed wherein the fabric sections being stitched are drawn through the machine by the cooperative action of two puller rollers.

As heretofore constructed, these puller rollers have been formed in one solid piece. When rollers of this character operate upon fabric sections which are infolded so as to be thicker at one side of the seam being produced by the machine, than at the other side thereof, often an objectionable curved finished edge is produced, owing to the fact that said fabric sections will be fed faster at the thicker portions due to the firmer grip of the puller rollers on said fabric sections at this part.

An object of the present invention is to provide a puller feed including puller rollers which are so constructed and arranged as to afford a substantially uniform pressure upon the fabric sections being stitched regardless of the thickness of the fabric sections at the parts where they are gripped by the puller rollers.

A further object of the invention is to provide a puller feed of the above character wherein one of the puller rollers is formed of sections located side by side and mounted so that the sections may rotate about independent centers and thus firmly grip and feed respectively fabric sections of varying thicknesses.

A further object of the invention is to provide a puller feed of the above character wherein means is provided for shifting or permitting the shifting of the centers about which said sections rotate.

Still another object of the invention is to provide a puller feed including a roller formed of sections arranged side by side wherein the various sections are mounted so that they may yield or shift automatically as the thicknesses of the fabric upon which they bear vary.

These and other objects will in part be obvious and will in part be hereinafter more fully disclosed.

In the drawings which show by way of illustration one embodiment of the invention:—

Figure 1 is a side elevation of the improved rollers as applied to the machine illustrated in the patent above mentioned, Fig. 2 is a front elevation, partly in section, of the preferred form of the upper puller roller, Fig. 3 is a plan view thereof, Fig. 4 is a side elevation partly in section, Fig. 5 is a detailed elevation of one of the saddle members, Fig. 6 is a part elevation, partly in section, of a modification, Fig. 7 is a plan view thereof, Fig. 8 is a side elevation partly in section, Fig. 9 is a detail perspective of one of the saddles, Fig. 10 is a front view, partly in section, of still another modification, Figs. 11 and 12 are side and plan views thereof, Fig. 13 is a detailed view of the roller carrying member, Fig. 14 is a plan view of the stitched fabric, and Fig. 15 is a section of the fabric on line 15—15 and also showing in section the rollers operating on various thicknesses.

The invention is directed to a puller feed for sewing machines of the character shown and described in the patent granted to Dudley S. Seymour, July 6, 1915, #1,145,-619. In this patent there is disclosed a puller feed wherein the fabric is drawn through the machine by opposed co-operating puller rollers. Each of these puller rollers is made in one solid section and they are mounted so that the two rollers have a relatively bodily movement toward and from each other. As above noted, when rollers of the above character are used, in a machine where the fabric sections are being stitched, and which sections are thicker at one side of the seam than at the other, an objectionable curved finished edge is liable to be produced owing to the fact that said fabric sections will be gripped more firmly at one side of the seam than at the other.

The present invention consists broadly in so constructing the puller rollers as to bring about a substantially uniform pressure upon the fabric sections being stitched, regardless of the thickness of the fabric sections at any particular part of the seam. This has been accomplished by forming one of the puller rollers in section which are located side by side and in mounting said sections so that they may rotate or turn about different centers. Where the sections are mounted to rotate about different centers, the fabric engaging surfaces of these sections will be in different horizontal planes, and therefore different thicknesses in the fabric being stitched will be accommodated and at the same time, a substantial uniform gripping of the sections secured and thus a uniform feeding of all parts of the fabric sections engaged by the puller rollers will be obtained. In one form of the invention these sections of the puller roller are mounted so that certain of said sections will be automatically shifted depending on the thickness of the fabric and in another form of the invention certain of said sections may be manually shifted to different centers so as to be properly set to accord with the thickness of the fabric sections being stitched.

As set forth in the above mentioned patent and illustrated in Fig. 1 of the present drawing, the lower puller roller 1 is intermittently operated by mechanism (not shown) from the eccentric 2 of the main sewing machine feed 3 and the material passing through the machine is passed to the puller between the upper and lower feed rollers thereof, so that as the feed of the main machine operates, the feed of the puller will be operated in unison therewith and the material pulled through the machine.

The construction of the present invention is identical with that of the patent except that the yoke and upper puller roller of the patent have been replaced by the improved device. In this construction the yoke 4 is detachably connected to the vertical rod 5 of the puller feed. This yoke 4 is provided with depending arms 5ª and 6 formed with laterally extending ears 7, bored at their outermost portion to receive screws or other members 8 adapted to form journals on which are pivotally mounted the swinging saddles 9 and 10. These saddles, at their forward ends, are respectively provided with laterally extending hollow sleeves 11 forming journals on which rotate the outside sections 12 and 13 of the upper puller roller. Extending through these hollow sleeves is the bearing shaft or spindle 14, on the central portion of which, between the outside sections 12 and 13 freely rotates the central section 15 of the upper puller roller. The ends of the shaft 14 project into bores 16 in the depending arms 5ª and 6 and have a fixed relation thereto. As shown in the drawings, the diameter of these sleeves is sufficient to allow of vertical adjustment between the shaft 14 and the swinging saddles 9 and 10, so that the sections of the roller carried by these saddles may move vertically with respect to the central section 15 mounted on the shaft 14.

In order to permit a yielding movement of these saddles, the yoke 4 is suitably bored vertically as at 17 and 18 to provide housings for coil springs 19, which are arranged between plugs 20 threaded into the tops of said bores and the upper faces 21 of the swinging saddles 9 and 10, so that the springs constantly tend to press the sections 12 and 13 downwardly, the bearing shaft 14 limiting the downward movement of these saddles.

In another embodiment of the invention the yoke 22 has a centrally disposed opening to receive the before described rod 5 depending from the puller feed frame. This yoke has two downwardly extending arms 23 and 24 provided at their lower extremities with opposed bores 25 forming bearings for a roller supporting shaft or spindle 26 on which the central section 37 of the puller roller is mounted for rotation. In order to provide a yieldable mounting for the sections on either side of the section 37 the yoke 22 is provided with opposed guideways 28 on each side of its central bore, and intermediate said guideways with vertically extending bores 29 in which are arranged coil springs 30 the upper ends of which bear against caps 31 threaded into the tops of said bores. Slidable in these guideways 28 are opposed roller section bearing saddles 31ª, the upper portions of which as shown in Fig. 8 are formed with upstanding guides 32 adapted to fit said guideways and forming therebetween the seats or shoulders 33 against which the bottoms of the coil springs 29 are adapted to bear. At its lower portion, each saddle is provided with an inwardly projecting sleeve 34 forming bearings for the two outside roller sections 35 and 36. These sleeves are of sufficient inner diameter 37ᵃ to permit relative vertical movement between the saddles and the roller shaft 26, which extends transversely through said sleeves. It will thus be seen that the three sections of the upper puller roller are arranged side by side between the depending arms 23 and 24, the central section being provided with a bearing on the shaft 26, while the outside sections are provided with bearings on the sleeves 34, which are vertically shiftable relative to said shaft 26, and furthermore, that these sections 35 and 36 are normally pressed downwardly by means of the coil springs 30. If desired, the top of the yoke 22 at the guideways may be covered with plates 38, 39 through which screws 40 may pass into the threaded openings 41 of the upstanding guides 32 of the saddles, so that the upper ends of the guides 32 are not exposed.

In lieu of three sections it may be desirable to use the two section construction illustrated in Figs. 10 to 13 inclusive, it being understood of course that the three-section construction previously described is capable of use with two or more sections with slight modifications.

In the preferred form of a two section roller, the depending ears 43 and 44 of the yoke 42 are provided with opposed bores 45, 46, one of which, 46, is larger than the other. These bores receive the roll-bearing member 47, comprising a shaft portion 48 and a preferably integral eccentric saddle 49. As illustrated clearly in Figs. 10 and 13, this saddle has adjacent thereto the journal 50, fitting within the larger aperture 46 of the depending ear 44. The roll bearing member 47 may be held in adjustable position relative to the yoke ears by means of screws 51 or an equivalent device. As will be clear, the shaft portion 48 rotatably receives thereon the roll 52, while the other roll 53 is carried by the eccentric saddle 49. Adjustment of the eccentric produces a relative vertical adjustment of these rolls 52 and 53.

In operating this improved puller feed in connection with a machine stitching fabrics of varying thicknesses, the roller sections must act on fabric surfaces lying in different horizontal planes. For instance, Fig. 15 illustrates the operation of the three-section upper puller roller acting upon a pants top. In this view, the roller section 12 bears on a portion of the fabric composed of five stitched layers; the infolded pants fabric 54, the intermediate belt loop 55, and the infolded lining strip 56; the roller section 15 bears on but two sections of fabric, the pants fabric 54 and the lining strip 56, while the roller section 13 bears on that portion of the pants top composed of three fabric layers; the infolded lining strip 56, and the pants fabric 54. As a result of their resilient mounting, the outside sections 12 and 13 yield so that the feeding pressure of the three sections on the fabric is substantially uniform. In the two-section type of roller as shown in Figs. 10 and 12, the adjustable section 53 may be set for any desired thickness of fabric to accomplish the same result, except that there is obviously no automatic compensation.

It is obvious that minor changes in the details of construction and the arrangement of parts may be made without departing from the spirit of the invention as set forth in the appended claims.

Having thus described the invention, what I claim as new and desire to secure by Letters-Patent is:—

1. A puller feed for sewing machines including in combination, cooperating puller rollers one of which is formed in sections located side by side, and means for supporting said sections whereby the same may yield bodily independently as the thickness of the fabric between the puller rollers varies.

2. A puller feed for sewing machines, including opposed co-operating rollers, one of which is formed of sections located side by side, and means for supporting said sections whereby they may rotate about independent axes, at least one of said axes being rectilinearly movable in a plane at right angles to the plane of movement of the fabric, so that fabric sections of varying thicknesses may be firmly gripped and fed by said rotatable sections.

3. A puller feed for sewing machines including opposed co-operating rollers, one of which is formed in sections located side by side, means for supporting said sections, whereby they may rotate about independent axes, at least one of said axes being rectilinearly movable in a plane at right angles to the plane of movement of the fabric, so that fabric sections of varying thicknesses may be firmly gripped and fed thereby, and means whereby the axes may be shifted relative to each other.

4. A puller feed for sewing machines including opposed co-operating rollers, one of which is formed in sections located side by side, and yielding means for supporting said sections whereby they may rotate about independent axes, at least one of said axes being rectilinearly movable in a plane at right angles to the plane of movement of the fabric, so that fabric sections of varying thicknesses may be firmly gripped and fed thereby.

5. In a puller feed, the combination of a supported yoke, a shaft carried thereby, a roller section mounted on said shaft, a plurality of saddles mounted on said yoke provided with bored bearings adapted to carry roller sections thereon and the shaft there-through, said bore permitting relative movement between said shaft and bearings and resilient means adapted to force said bearings out of co-axial alignment with said shaft.

6. In a puller feed, the combination of a yoke having guideways, a shaft carried by said yoke adapted to support a roller section, roller section bearing saddles sliding in said guideways on opposite sides of said first-mentioned roller section, roller sections carried by said saddles and spring means for forcing said sections carried by said saddles out of co-axial alignment with said section on said shaft.

In testimony whereof, I affix my signature.

JAMES R. MOFFATT.